United States Patent
Kudritskiy

(10) Patent No.: US 8,903,746 B2
(45) Date of Patent: Dec. 2, 2014

(54) SYSTEM AND METHOD FOR VIEWING, MODIFYING, STORING, AND RUNNING ARTIFICIAL NEURAL NETWORK COMPONENTS

(75) Inventor: Andrey Kudritskiy, Brooklyn, NY (US)

(73) Assignee: Audrey Kudritskiy, Brooklyn, NY (US)

( * ) Notice: Subject to any disclaimer, the term of this patent is extended or adjusted under 35 U.S.C. 154(b) by 267 days.

(21) Appl. No.: 13/427,375

(22) Filed: Mar. 22, 2012

(65) Prior Publication Data

US 2013/0254138 A1    Sep. 26, 2013

(51) Int. Cl.
G06F 17/00    (2006.01)
(52) U.S. Cl.
USPC .......................................................... 706/11
(58) Field of Classification Search
USPC .......................................................... 706/15
See application file for complete search history.

(56) References Cited

U.S. PATENT DOCUMENTS

| | | | |
|---|---|---|---|
| 5,226,092 A | 7/1993 | Chen | |
| 6,324,532 B1 | 11/2001 | Spence et al. | |
| 6,480,621 B1 | 11/2002 | Lyon | |
| 7,426,501 B2 | 9/2008 | Nugent | |
| 7,548,894 B2 | 6/2009 | Fuji | |
| 2007/0094168 A1 | 4/2007 | Ayala et al. | |

OTHER PUBLICATIONS

International Search Report and Written Opinion of the International Searching Authority for PCT/US13/33110, issued on Aug. 6, 2013.
Integrate & Fire Neural Network, Retrieved from the Internet:<URL: http://www2.cs.uidaho.edu/~tsoule/website_with_hierarchy/integrate.html> on Mar. 20, 2012.
Jan Leonard Hemmen et al., "Models of neural networks IV: early vision and attention" Springer-Verlag New York, Inc., 2002, p. 11 Retrieved from the Internet:<URL: http://books.google.com/books?id=vj4QpPnICvMC&pg=PA11&lpg=PA11&dg=neural+network+threshold+fire+reset&source=bl&ots=r2gjfxakEG&sig=rg__VFjOHPCehdNwb13nCoTUw9uw&hl=en&ei=JOPoTuTROert0gG-0fCaCg&sa=X&oi=book_result&ct=result&resnum=4&ved=0CDMQ6AEwAw#v=onepage&q=neural%20network%20threshold%20fire%20reset&f=false.> on Mar. 21, 2012.
Andy Greenberg, "IBM's Cat-Brain Breakthrough," Forbes, Nov. 18, 2009.
Kate Taylor, "IBM designs chips that mimic the human brain," Aug. 18, 2011.

*Primary Examiner* — Alan Chen
(74) *Attorney, Agent, or Firm* — Kenyon & Kenyon LLP

(57) ABSTRACT

A system and method for artificial neural network processing includes, for example, modifying, by a computer processor, a value of a charge of a node of an artificial neural depending on a number of elapsed steps since a prior predefined significant event. A system and method includes, for example, providing by a processor a real-time representation of an artificial neural network and of graphical effects of a running of the neural network. A system and method includes, for example, automatically modifying the behavior of network nodes based on simultaneous occurrences of events.

29 Claims, 9 Drawing Sheets

SYSTEM AND METHOD FOR VIEWING, MODIFYING, STORING, AND RUNNING ARTIFICIAL NEURAL NETWORK COMPONENTS

FIELD OF THE INVENTION

The present invention relates to the field of computer-based artificial neural networks. More particularly, the present invention pertains to improved methods of storing, viewing, and modifying artificial neural network components.

BACKGROUND

An artificial neural network (ANN) is a type of information processing system whose architecture is inspired by the biologically-evolved neural systems found in animals. A neural network includes an interconnected set of processing units called nodes. The network is designed to accept a set of input data, called input pattern data, process the input pattern data, and return a set of output data called output pattern data. Although dependent on other nodes in the network for input, each node in a neural network can be configured to independently process its input (e.g., in parallel) with other nodes of the network.

An ANN can be utilized in circumstances where a system receives multiple inputs, processes these inputs via nodes of the ANN, and performs actions based on outputs from the nodes. For example, a vehicle incorporating an ANN can 1) receive various inputs such as proximities to other vehicles, outside temperature, proximity to destination, etc., 2) process such inputs, and 3) modify the vehicle's behavior by, for example, adjusting the current speed of the vehicle, steering the vehicle, and/or changing the temperature inside the vehicle. ANNs may be used in various fields such as robotics, system identification and control (for example, vehicle control and process control), function approximation, regression analysis, pattern and sequence recognition (for example, radar systems, face detection, object detection, gesture recognition, speech recognition, and handwritten text recognition), novelty detection, sequential decision making (for example, chess, backgammon, and poker), computer numerical control, medical diagnosis, financial applications (for example, automated trading systems), data mining, e-mail spam filtering, other data processing, etc.

SUMMARY

A computer-implemented method for artificial neural network processing, according to an example embodiment of the present invention, includes: modifying, by a computer processor, a value of a charge of a node of an artificial neural network based on an input to the node, the node being configured to be activated to produce an output responsive to the value of the charge reaching a first threshold value; determining, by the processor, that a number of steps, that have elapsed since (a) a last activation of the node and/or (b) a last modification of the value of the charge based on input to the node, is greater than a second threshold value; and responsive to the determination, modifying, by the processor, the charge of the node.

In an example embodiment, the charge of the node is reset to 0 in the modifying that is responsive to the determination.

In an example embodiment, the charge of the node is reset to a predetermined value in the modifying that is responsive to the determination.

In an example embodiment, the charge of the node is decreased by a predetermined amount in the modifying that is responsive to the determination.

In an example embodiment, the method further includes: for each occurrence of any qualifying event(s), incrementing a value of a first variable; and (a) responsive to each modification of the value of the charge of node based on input to the node, or (b) responsive to each activation of the node, updating a value of a second variable to be consistent with the value of the first variable; where the determining includes comparing the values of the first and second variables.

A computer-implemented method for artificial neural network processing, according to an example embodiment of the present invention, includes: storing, by a computer processor, node records, each node record including a respective identifier of a respective node, a respective charge value of the respective node, and a respective step identifier identifying a step at which the respective node had been activated, or had its charge value modified in response to an input by an activated connection to which the respective node connects; storing, by the processor, connection records, each connection record including a respective identifier of a respective connection between a respective pair of nodes corresponding to a pair of the stored node records, a respective identifier of a first one of the respective pair of nodes from which the respective connection originates, a respective identifier of a second one of the respective pair of nodes at which the respective connection terminates, and a respective weight; and producing, by the processor, an output based on values identified in the node records and the connection records.

In an example embodiment, the method further includes for each of the node records: modifying its respective charge value according to the weight of one of the connection records that specifies the respective identifier of the respective node of the respective node record as the second of the respective pair of nodes of the respective connection record upon activation of the respective connection; comparing the modified charge value to an activation threshold; and responsive to determining in the comparing step that the modified charge value satisfied the activation threshold, updating a charge value of another node corresponding to another node of the stored node records, the another node being identified, by another connection of the connection records that identifies the respective node as the node from which the respective connection of the another connection of the connection records originates, as the node at which the respective connection of the another connection of the connection records terminates.

In an example embodiment, the method further includes: modifying one or more node records by modifying the respective node record(s)' respective charge value based on a determined number of elapsed steps since the step identified by the node record(s)' respective step identifier.

In an example embodiment, the node records are stored in a first table that includes a first column in which the node identifiers of the node records are stored, a second column in which the step identifiers of the node records are stored, and a third column in which the charge values of the node records are stored; and the connection records are stored in a second table that includes a first column in which the connection identifiers of the connection records are stored, a second column in which the identifiers of the originating nodes of the connection records are stored, a third column in which the identifiers of the terminating nodes of the connection records are stored, and a fourth column in which the weights of the connection records are stored.

In an example embodiment, for each of the connection records, the node identifiers of the respective connection record correspond to the node identifiers of the node records corresponding to the pair of nodes connected by the respective connection of the respective connection record.

In an example embodiment, different activation thresholds are used in the comparing step for different ones of the nodes to which the node records correspond.

In an example embodiment, each row of the first table corresponds to a respective one of the node records, and each row of the second table corresponds to a respective one of the connection records.

In an example embodiment, each of the node records further includes an identification of the respective activation threshold used for the node to which the respective node record corresponds.

A computer-implemented method for artificial neural network visualization, according to an example embodiment of the present invention, includes: displaying, by a computer processor and in a first portion of a graphical user interface, a real-time graphical representation of the neural network; and displaying, by the processor and in a second portion of the graphical user interface, real-time graphical effects of a running of the neural network.

In an example embodiment, the neural network includes nodes and connections between pairs of nodes, and the method further includes: responsive to user-selection from the first portion of the graphical user interface of a graphical representation of one of the connections, or a graphical representation of one of the nodes, displaying attributes of the connection or the node of the selected graphical representation.

In an example embodiment, the neural network includes nodes and connections between pairs of nodes, the method further includes: graphically indicating in the first portion a real-time activation of a node and/or a connection of the neural network that is graphically represented in the first portion.

In an example embodiment, the method further includes: responsive to user interaction with the graphical representation in the first portion, modifying attributes of one or more components of the neural network, where the modification affects in real-time the graphical effects displayed in the second portion of the graphical user interface.

In an example embodiment, the user interaction includes editing attributes associated with a selected connection or a selected node.

In an example embodiment, the user interaction includes manipulating the graphical representation of connection(s) in the first portion to change node(s) connected to the connection(s).

In an example embodiment, the method further includes: storing in a database all modifications made to the neural network via the graphical user interface.

A computer-implemented method to learn and/or unlearn behavior in an artificial neural network, according to an example embodiment of the present invention, includes: responsive to simultaneous activation of a first input node and a second input node connected to a third node, modifying, by a computer processor, a weight of a connection between the first input node and the third node.

In an example embodiment, modifying the weight includes increasing the weight if a connection weight between the second input node and the third node is positive.

In an example embodiment, modifying the weight includes decreasing the weight if a connection weight between the second input node and the third node is negative.

In an example embodiment, the artificial neural network is integrated into a robotics system, and the weight modification changes the behavior of the robotics system.

A computer system for artificial neural network processing, according to an example embodiment of the present invention, includes a computer processor configured to: modify a value of a charge of a node of an artificial neural network based on an input to the node, the node being configured to be activated to produce an output responsive to the value of the charge reaching a first threshold value; determine that a number of steps, that have elapsed since (a) a last activation of the node and/or (b) a last modification of the value of the charge based on input to the node, is greater than a second threshold value; and responsive to the determination, modify the charge of the node.

A computer system for artificial neural network processing, according to an example embodiment of the present invention, includes a computer processor configured to: store node records, each node record including a respective identifier of a respective node, a respective charge value of the respective node, and a respective step identifier identifying a step at which the respective node had been activated, or had its charge value modified in response to an input by an activated connection to which the respective node connects; store connection records, each connection record including a respective identifier of a respective connection between a respective pair of nodes corresponding to a pair of the stored node records, a respective identifier of a first one of the respective pair of nodes from which the respective connection originates, a respective identifier of a second one of the respective pair of nodes at which the respective connection terminates, and a respective weight; and produce an output based on values identified in the node records and the connection records.

A computer system for artificial neural network visualization, according to an example embodiment of the present invention, includes a computer processor configured to: display in a first portion of a graphical user interface, a real-time graphical representation of the neural network; and display in a second portion of the graphical user interface, real-time graphical effects of a running of the neural network.

A computer system for learning and/or unlearning behavior in an artificial neural network, according to an example embodiment of the present invention, includes a computer processor configured to: responsive to simultaneous activation of a first input node and a second input node connected to a third node, modify a weight of a connection between the first input node and the third node.

A non-transitive computer-readable medium, according to an example embodiment of the present invention, has stored thereon instructions executable by a processor, the instructions which, when executed by the processor, cause the processor to perform a method for artificial neural network processing, the method including: modifying a value of a charge of a node of an artificial neural network based on an input to the node, the node being configured to be activated to produce an output responsive to the value of the charge reaching a first threshold value; determining that a number of steps, that have elapsed since (a) a last activation of the node and/or (b) a last modification of the value of the charge based on input to the node, is greater than a second threshold value; and responsive to the determination, modifying the charge of the node.

A non-transitive computer-readable medium, according to an example embodiment of the present invention, has stored thereon instructions executable by a processor, the instructions which, when executed by the processor, cause the processor to perform a method for artificial neural network processing, the method including: storing node records, each node record including a respective identifier of a respective node, a respective charge value of the respective node, and a respective step identifier identifying a step at which the respective node had been activated, or had its charge value modified in response to an input by an activated connection to which the respective node connects; storing connection records, each connection record including a respective identifier of a respective connection between a respective pair of nodes corresponding to a pair of the stored node records, a respective identifier of a first one of the respective pair of nodes from which the respective connection originates, a respective identifier of a second one of the respective pair of nodes at which the respective connection terminates, and a respective weight; and producing an output based on values identified in the node records and the connection records.

A non-transitive computer-readable medium, according to an example embodiment of the present invention, has stored thereon instructions executable by a processor, the instructions which, when executed by the processor, cause the processor to perform a method for artificial neural network visualization, the method including: displaying in a first portion of a graphical user interface, a real-time graphical representation of the neural network; and displaying in a second portion of the graphical user interface, real-time graphical effects of a running of the neural network.

A non-transitive computer-readable medium, according to an example embodiment of the present invention, has stored thereon instructions executable by a processor, the instructions which, when executed by the processor, cause the processor to perform a method to learn and/or unlearn behavior in an artificial neural network, the method including: responsive to simultaneous activation of a first input node and a second input node connected to a third node, modifying a weight of a connection between the first input node and the third node.

A computer-implemented method, according to an example embodiment, to optimize an artificial neural network, includes: modifying, by a computer processor, a) respective weight(s) of at least a connection of a neural network, and/or b) respective threshold(s) of at least a node of the neural network; responsive to inputs to the neural network, determining whether one or more outputs of the neural network match one or more desired outputs; upon determining that one or more outputs of the neural network match one or more desired outputs, saving a configuration of the neural network and outputs of the neural network; repeating the modifying, the determining, and the saving steps until the at least one output of the neural network matches all desired outputs.

DETAILED DESCRIPTION

Current ANN systems and applications lack sufficient features to view and modify ANN components in real-time in an efficient manner. In addition, there is a need for storing various components of ANNs in a manner optimal for control and modification of the ANNs.

Figure 1:
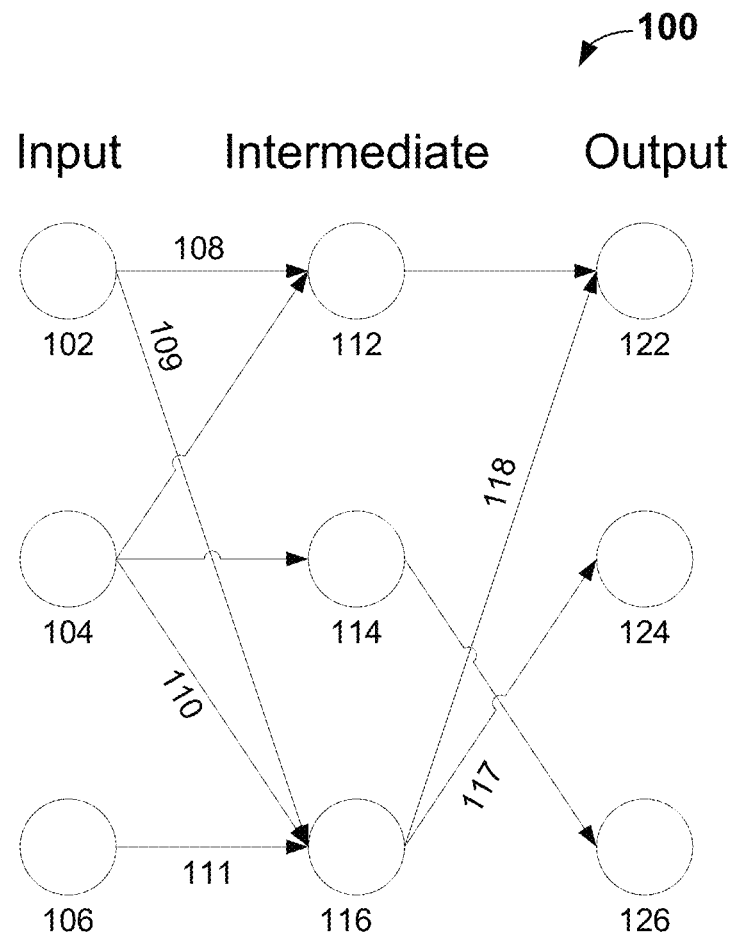
FIG. 1 illustrates an artificial neural network according to an example embodiment of the present invention.

FIG. 1 illustrates an exemplary artificial neural network (ANN) 100 in an example embodiment of the present invention. The example ANN 100 includes several nodes forming a plurality of layers. A first layer (input layer) includes input nodes 102, 104, and 106. A second layer (output) includes output nodes 122, 124, and 126. The example ANN also includes an intermediate layer including nodes 112, 114, and 116. The nodes are connectable to each other via connections. It is noted that there can be additional or fewer layers and/or nodes per layer in other example embodiments.

In an example embodiment, each node in the ANN 100 is activatable based on a respective set of preconditions. In an example embodiment, each of one or more of the nodes has one or more attributes. Example attributes include an activation threshold and a current charge. For example, a node is activatable responsive to the value of the respective current charge of the respective node reaching or exceeding the respective node's activation threshold. In an example embodiment, the activation includes 1) activating connections originating from the respective node and 2) resetting the current charge of the respective node to zero or to another predetermined original value. For example, referring to FIG. 1, activation of node 102 would activate connections 108 and 109.

In an example embodiment, each of one or more of the connections is associated with various attributes including a respective weight. The weight can be positive or negative. For example, when a connection is activated by the activation of its respective source node, that connection increases/decreases, according to the assigned weight, the current charge of a target node connected to the connection. For example, when connection 108 is activated by its activated source node 102, the current charge of target node 112 is increased/decreased based on the weight of connection 108. Additionally, two or more source nodes can simultaneously be activated, and based on the weights of the connections from the source nodes to the target node, the current charge of the target node be can be increased/decreased (for example, the charge of the target node can be increased/decreased by the sum of the weights of the connections from the source nodes to the target node). The current charge of the target node 112 can thus be repeatedly updated over time by the activations of the source connections connecting to the target node 112. As noted above, the ANN can be configured such that once the current charge of the target node 112 reaches or exceeds its threshold value, for example, by the repeated modification of its current charge, the target node 112 itself is activated. It is noted that a connection's weight can be such that a single activation of the connection causes a modification of the current charge of the target node to which it connects that is sufficient to activate the target node.

In example embodiments, a node's current charge can be decreased, reset to 0, or updated to a predetermined value responsive to the passing of a predetermined amount of time since the last time the respective node fired and/or since the last time the current charge of the respective node has been updated by an activation of a source connection to which it is connected. Alternatively or additionally, in an example embodiment a node's current charge is decreased, reset to 0, or updated to a predetermined value responsive to the passing of a predetermined number of clock cycles since the last time the respective node fired and/or since the last time the current charge of the respective node has been updated by an activation of a source connection to which it is connected.

Alternatively or additionally, a node's current charge can be decreased, reset to 0, or updated to a predetermined value responsive to the passing of a predetermined number of steps since the last time the respective node fired and/or since the last time the current charge of the respective node has been updated by an activation of a source connection to which it is connected. In another example embodiment, a node's current charge can be decreased, reset to 0, or updated to a predetermined value if the node's charge was not modified due to the activation of another node in the current step. In an example embodiment, a step is defined as the occurrence of any event, e.g., a single event or a plurality of simultaneously occurring events in the ANN 100. In an example embodiment, a step refers to the occurrence of one or more predefined qualifying events.

In an example embodiment, the current step number is stored in a global variable. For example, in an example embodiment, the activation of input node 102 sets the current step number to n, the resulting simultaneous activation of connections 108 and 109 increments the current step number to step n+1, and, where the activations of connections 108 and 109 in step n+1 activate node 112, the activation of node 112 increments the current step number to n+2. Multiple events can occur simultaneously during a step. For example, in an embodiment, both nodes 112 and 116 can be activated simultaneously during step n+2.

That which is considered a qualifying event can be varied, for example in accordance with user input settings. For example, in an example embodiment, node activation can be set as a qualifying event, but the system can be configured such that a connection activation is not considered a qualifying event for incrementing the step number. For example, the activation of input node 102 can accordingly set the current step number to n, the subsequent activation of connections 108 and 109 not affecting the step number, but the activation of node 112 further updating the current step number to n+1.

In an example embodiment, to keep track of whether a node in ANN 100 should be decremented, reset, or updated based on the current step number, the system associates with each of one or more, e.g., all, of the nodes a last activated step attribute that indicates the last step at which the respective node was activated, and that is updated responsive to activation of the respective node to reflect the step at which the activation occurred. In an example embodiment, the system compares the step value of the step attribute of the node to value of the global step variable, and, if the difference between the last activated step of the node and the current step, as reflected by the comparison, is greater than a predetermined threshold, the node's current charge is responsively decreased, reset to 0, or updated to a predetermined value.

In an example embodiment, the information regarding the ANN 100, e.g., including the above-described node and/or connection values, are stored in a database. In an example embodiment, changes to ANN 100 based on step number, as described above, are applied by executing one or more SQL statements. In an example embodiment, the one or more SQL statement(s) are executed via one or more stored procedure(s).

Figure 2:
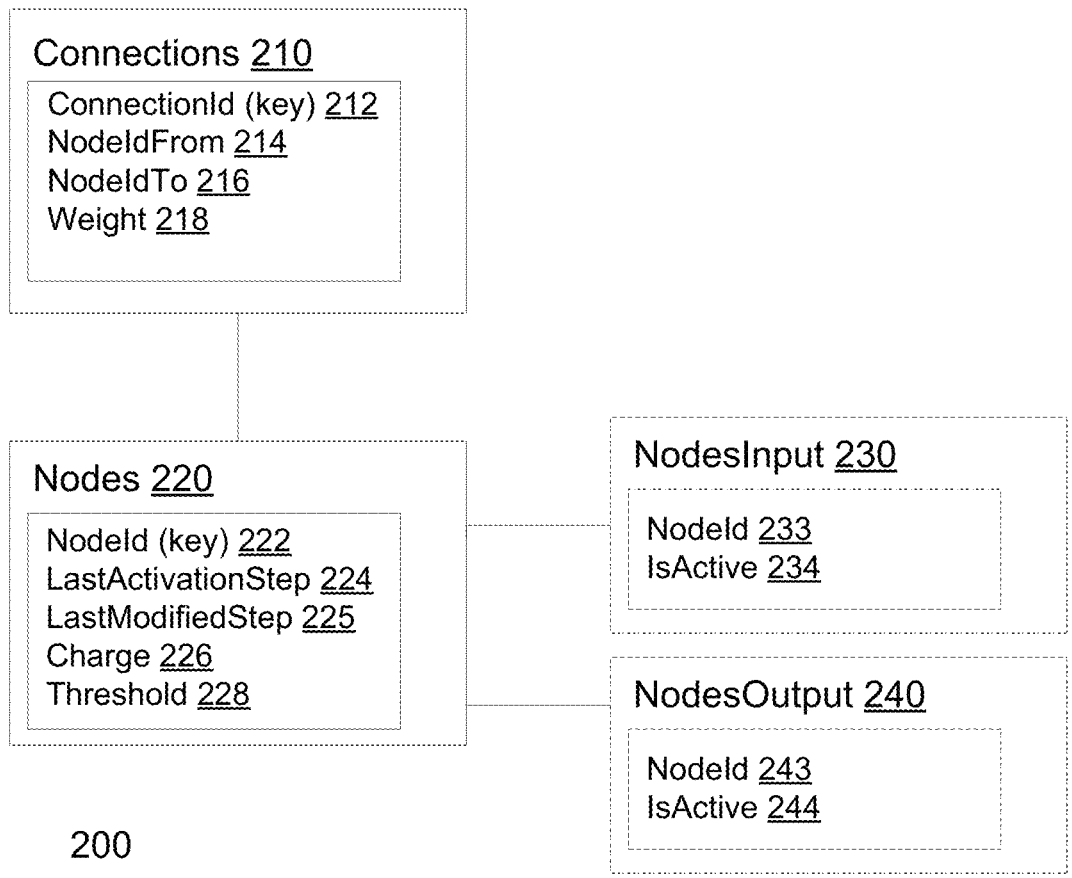
FIG. 2 illustrates database components for storing information about an artificial neural network (ANN) according to an example embodiment of the present invention.

FIG. 2 illustrates an example database 200 for storing information about an ANN, such as the ANN described in FIG. 1. In an example embodiment, records 220 are stored, each representative of a respective one of the nodes of the ANN. The Nodes records 220 can be stored as a table, for example, where each row corresponds to a respective one of the records. Example data elements of the records include NodeId 222, LastActivationStep 224, LastModifiedStep 225, Charge 226, and Threshold 228, to which respective columns of the table can correspond.

In an example embodiment, records 210 are also stored, each representative of a respective one of the connections of the ANN. The Connections records 210 can be stored as a table, for example, where each row corresponds to a respective one of the connections records. Example data elements of the connections records include ConnectionId 212, NodeIdFrom 214, NodeIdTo 216, and Weight 218, to which respective columns of the connections table can correspond.

In an example embodiment, records 230 are also stored, each representative of the initial input nodes of the ANN, i.e., the input nodes which do not have any other input nodes connected to them. In an example embodiment, initial input nodes can be connected directly to input devices such as a bumper of a car. In an example embodiment, the records 230 identify the initial input nodes by the NodeId keys 222 of the node records 220. The records 230 can be stored as a table, for example, where each row corresponds to a respective one of the records. Example data elements of the records include NodeId 233 and IsActive 234.

In an example embodiment, records 240 are also stored, each representative of the final output nodes of the ANN, i.e., the output nodes which do not have any other output nodes connected to them. In an example embodiment, final output nodes can be connected directly to output devices and cause the output device to perform an action, for example, a final output node can be connected to the wheel of car, and can cause the wheel to turn upon activation of the node. In an example embodiment, the records 240 identify final output nodes, the identification being by the NodeId keys 222 of the node records 220. The records 240 can be stored as a table, for example, where each row corresponds to a respective one of the records. Example data elements of the NodesOutput records 240 include NodeId 243 and IsActive 244.

In an example embodiment, the Nodes table 220 stores data representing nodes such as nodes of FIG. 1. For example, a row of table 220 represents node 116, the row including attribute information of node 116, such as a unique identifier for node 116, which can be the respective value of the primary key of table 220 corresponding to node 116, stored in the unique identifier column at the row corresponding to node 116. The row associated with node 116 can include a value in the LastModifiedStep column to identify the last step at which node 116's charge was modified. The row associated with node 116 can further include a value in the LastActivationStep column to identify the last step at which node 116 was activated. The row can include a charge 226 value in a charge column to store the current charge of node 116, which value, in an example embodiment, can be periodically decremented or reset to another value, e.g., 0, based on the value in the LastActivationStep and/or LastModifiedStep column at the row corresponding to node 116, as discussed above. The row associated with node 116 can also include a threshold 228 value in a threshold column at the row corresponding to node 116, which threshold value indicates the threshold at which node 116 is activated. In an example embodiment of the present invention, the system includes a processor configured to (a) compare the charge 226 value and the threshold value 228 of the row corresponding to node 116, and (b) when the value of charge 226 equals or exceeds the threshold value 228, reset the value of charge 226 of the row corresponding to node 116 to a predetermined reset value such as 0.

In an example embodiment, the Connections table 210 stores data representing connections such as the connections of FIG. 1, and the relationship between each connection and the nodes to which they connect. For example, the table 210 includes a row for each of the connections connected to node 116, i.e., connections 109, 110, 111, 117, and 118, where each row is uniquely identified by a respective ConnectionId value 212 in a ConnectionId column. As noted above, each row includes a respective Weight value 218 in a Weight column to denote the respective weight of the respective connection to which the respective row corresponds. The Weight values can be positive or negative. Each row can include a respective NodeIdFrom value 214 in a NodeIdFrom column and a respective NodeIdTo value 216 in a NodeIdTo, the values 214 and 216 being selected ones of the NodeIds of table 220 corresponding to the nodes connected to the respective connection to which the row corresponds. For example, the row representing connection 109 includes a value for column NodeIdFrom equal to the NodeId value of node 102 in the nodes table 220, since the source node of connection 109 is node 102. Similarly, the row representing connection 109 may include a value for column NodeIdTo equal to the NodeId value of node 116 in the nodes table 220, since the target node to which connection 109 connects is node 116.

In an example embodiment, the NodesInput table 230 includes data representing the initial input nodes of the ANN, such as the nodes of FIG. 1 (nodes 102, 104, and 106). For example, for the nodes of FIG. 1, the table 230 stores a row corresponding to node 106. The row will have the identifier of node 106 (from the Nodes 220 table) in the NodeId 233 column. The NodesInput table 230 can include an additional column, IsActive 234, to indicate whether a node in the table 230 has been activated in the current step. For example, if a stimulus from an input, such as the bumper of car coming into contact with an object, activates node 106, the value in the IsActive column can be set to true. In an example embodiment, once the step in which node 106 was activated has elapsed, the IsActive column can be set to false.

In an example embodiment, the NodesOutput table 240 stores data representing the final output nodes of the ANN, such as the nodes of FIG. 1 (nodes 122, 124, and 126). For example, for the nodes of FIG. 1, the table 240 stores a row corresponding to node 126. The row will have the identifier of node 126 (from the Nodes 220 table) in the NodeId 243 column. The NodesOutput table 240 can include an additional column, IsActive 244, to indicate whether a node in the table 240 has been activated in the current step. For example, if node 126 has been activated in the current step, the value in the IsActive column can be set to true. In an example embodiment, once the step in which node 126 was activated has elapsed, the IsActive column can be set to false.

Although FIG. 2 illustrates an exemplary database schema with four tables, a person having ordinary skill in the art will appreciate that the same information described with respect to the four tables of FIG. 2 can be stored in a different format, for example, in different combinations of record sets and/or tables. For example, in an example embodiment, both the NodesOutput 240 and NodesInput 230 tables can be eliminated, and the information in those tables can be retrieved from the Connections 210 table and the Nodes 220 table. On the other hand, inclusion of the NodesOutput 240 and/or the NodesInput 230 data can be advantageous for program encapsulation.

Figure 7:
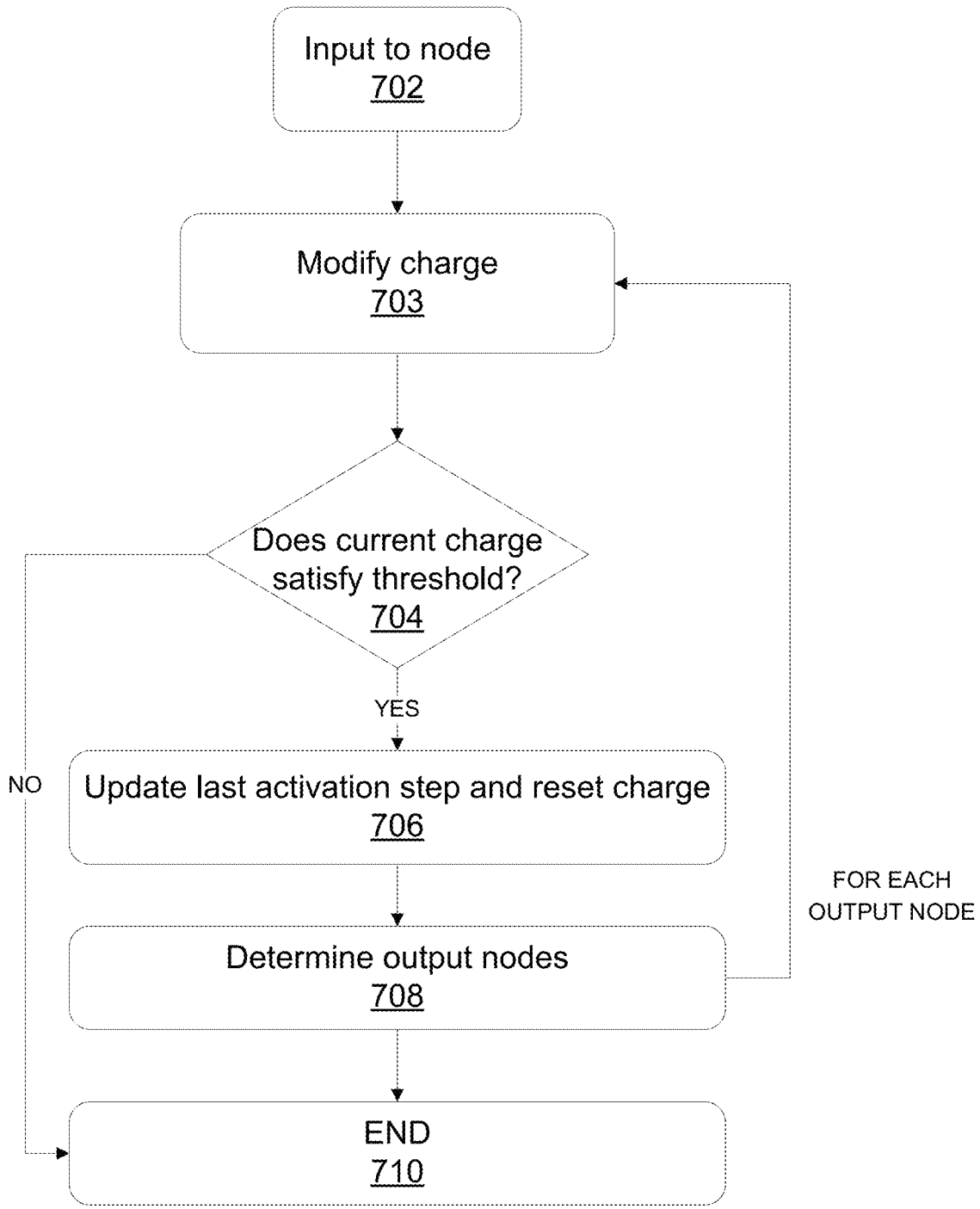
FIG. 7 is a flowchart of steps executed by a computer processor of a system in response to an input to an ANN, according to an example embodiment of the present invention.

FIG. 7 illustrates an exemplary sequence of steps executed by a computer processor of a system in response to an input to an ANN, such as the ANN described in FIG. 1. In an example embodiment, the ANN described in FIG. 1 can be employed in a system such as a vehicle. The vehicle might send an input signal (step 702) to the ANN based on an external event detected by a sensor on the vehicle, for example, the detection of slippery road conditions. In an example embodiment, responsive to the external event, the system determines resulting changes to the ANN and modifies the values of the ANN components accordingly. In an example embodiment, the input can be preprogrammed to activate initial input node 102. Thus, the system will retrieve the data record pertaining to the initial input node 102, which might be stored in a database, such as the database described with respect to FIG. 2, and set the respective record's IsActive field to true in the NodesInput table 230. In another example embodiment, the input can be preprogrammed to increase the current charge of a node, for example, node 102, by a predetermined amount, for example, 15. Thus, the system will retrieve the data record pertaining to node 102, which might be stored in a database, such as the database described with respect to FIG. 2, and modify the data record (step 703) by updating the corresponding row in the Nodes table 220. Specifically, the system will increment the value in the charge column 226 of the corresponding row by 15. The system then checks whether the updated charge satisfies, e.g., is greater than or equal to, the value of the threshold 228 column of the corresponding row. If the updated charge satisfies the threshold, the system updates the value in the last activation step column 224 to the current step (see above for a description of determining the current step), and resets the value of the charge column 226 to zero or a predetermined value. Once the system determines that an input node has been activated (either from the NodesInput table or from the Nodes table), the system determines the output nodes connected to node 102 (step 708), e.g., by retrieving data from the Connections table 210. Specifically, the system might retrieve all NodeIdTo 216 values from the rows in the Connections 210 table where the NodeIdFrom 214 value matches the NodeId 222 value associated with node 102. For each output node connected to node 102 (nodes 112 and 116), the system increments (or decrements) the charge of each respective output node depending on the weight or value of the respective connection connecting node 102 to the respective output node (step 703). Particularly, the system might use the weights or values specified in the Connections table 210 for the connection records whose NodeIdFrom 214 values match the NodeId 222 associated with node 102, and whose NodeIdTo 216 values respectively match output nodes 112 and 116, to update the respective charge values of nodes 112 and 116 in the Nodes table 220. For each output node connected to node 102 (nodes 112 and 116) and any further output nodes to which they (nodes 112 and 116) are connected as input nodes, the system repeats the above described steps 703-708 as needed.

Figure 8:
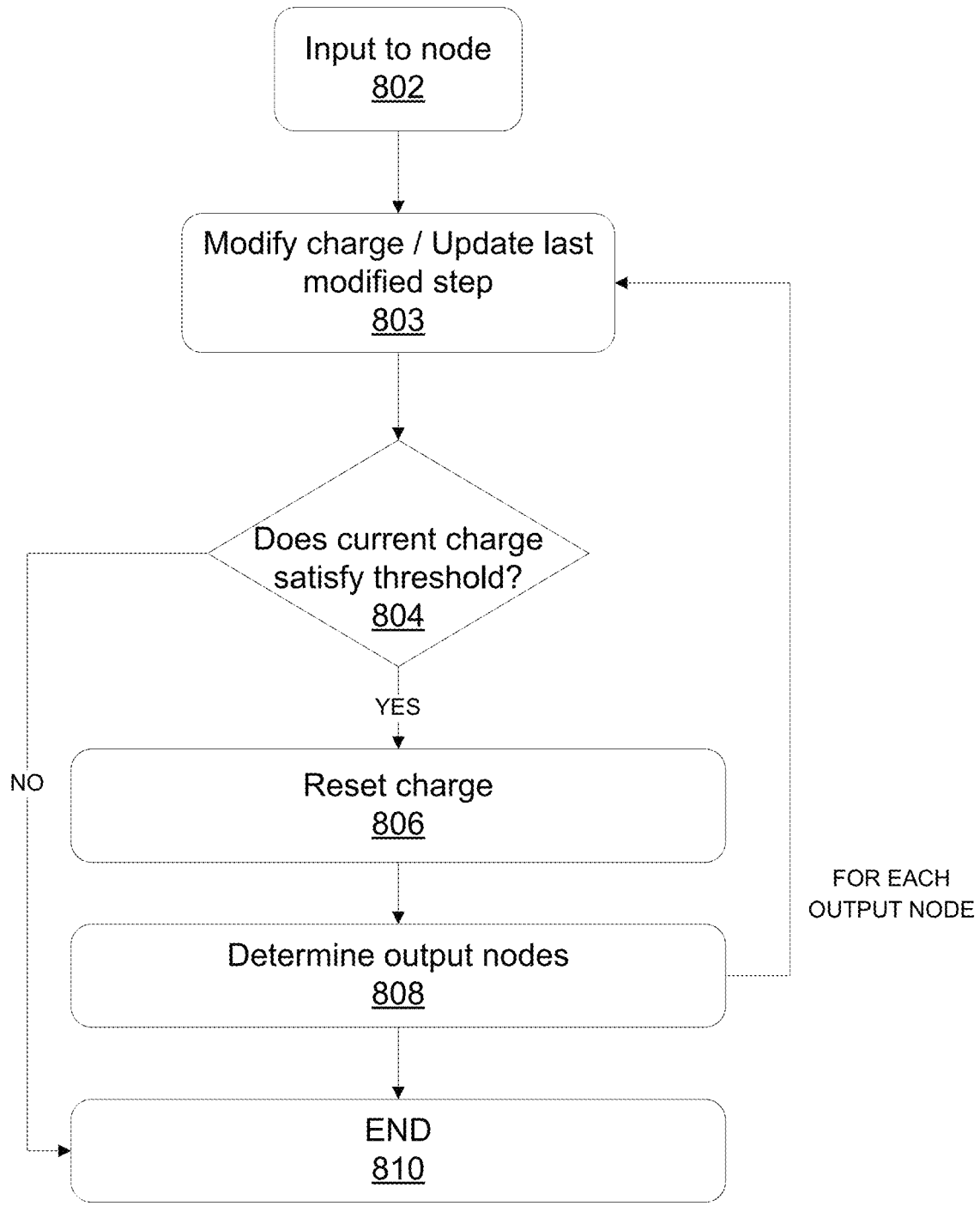
FIG. 8 is a flowchart of steps executed by a computer processor of a system in response to an input to an ANN, according to an example embodiment of the present invention.

FIG. 8 illustrates another exemplary sequence of steps executed by a computer processor of a system in response to an input to an ANN, such as the ANN described in FIG. 1. The exemplary sequence illustrated in FIG. 8 is similar to the sequence illustrated in FIG. 7, except for the use of a last modification step of a node instead of a last activation step of a node. In an example embodiment, in response to an input to a node (step 802), for example, node 102 with respect to FIG. 1, the system will retrieve the data record pertaining to node 102, which might be stored in a database, such as the database described with respect to FIG. 2, and modify the data record (step 803) by updating the corresponding row in the Nodes table 220. Specifically, the system will increment the value in the charge column 226 of the corresponding row and update the last modified step column 225 to the current step. The system will then check whether the current charge meets/exceeds the threshold (step 804) and reset the value of the charge column 226 to zero or a predetermined value as discussed above in FIG. 7. The system will determine the output nodes connected to node 102 (step 808) and repeat the steps 803-808 as needed as discussed above with respect to FIG. 7.

In an example embodiment, when a final output node is activated, such as node 126 (FIG. 1), the respective row of node 126 in NodesOutput 240 (FIG. 2) is modified by setting the IsActive column's value to true. The system may then read the value of the IsActive column to determine whether an output event should be triggered, for example, changing the speed of the vehicle.

Figure 3:
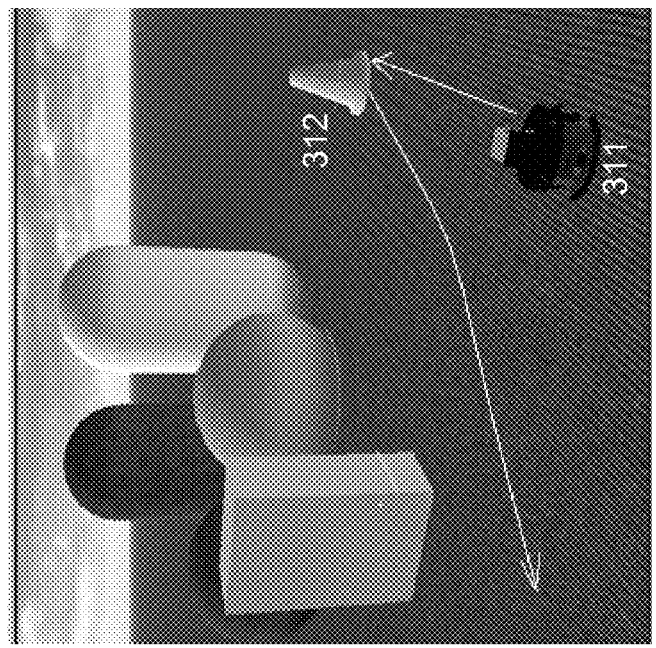
FIG. 3 illustrates a graphical user interface (GUI) to design, view, and/or modify ANNs according to an example embodiment of the present invention.
Figure 3:
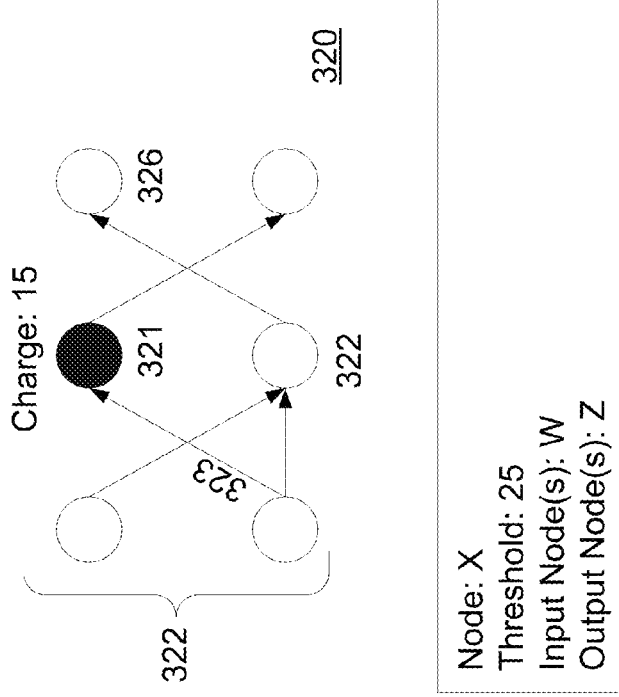

FIG. 3 illustrates a graphical user interface (GUI) 300 to design, view, and modify ANNs in real-time in an exemplary embodiment of the present invention. For example, the GUI 300 includes multiple windows including a window 320 for viewing a logical arrangement of the nodes and connections of the ANN 322, and for selecting and/or modifying the nodes and connections of the ANN 322; a window 330 for modifying the values of nodes and connections selected in window 320; and a window for viewing a real-time simulation or application of the ANN 322 shown/modified in windows 320 and 330.

In an example embodiment, the window 320 presents a graphical representation of an ANN 322 by presenting a respective graphical representation of each of the nodes and connections of the ANN 322, arranged to show on the GUI 300 which of the nodes are connected to which others of the nodes. The GUI 300 can be displayed to a user via an output device such as a computer monitor (not shown). The system is configured for a user to select and manipulate the nodes and connections of the ANN through windows 320 and 330. For example, the user can select a node 321 via an input device such as a keyboard, mouse, stylus, the user's finger (where a touch-screen is used), etc. In an example embodiment, the system is configured to update the interface to reflect the selection of the node, e.g., by a color, hatching, shading, or brightness setting of the selected node (or connection). For example, upon selection of node 321, the system, in an example embodiment, changes the color of node 321 to indicate to the user that the node has been selected.

In an example embodiment, responsive to the selection of the node or connection in the window 320, the system is configured to display information associated with the selected node or connection. For example, in response to the selection of the node 321, the system displays the information associated with the node 321 in window 330. For example, in an example embodiment, the window 330 displays that the name of selected node 321 is X, the threshold of the node 321 is 25, and that node 321 is connected to two nodes: an input node W (i.e., there is a connection originating from node W and ending at node 321), and an output node Z (i.e., there is a connection originating from node 321 and ending at node Z). The user can change the attributes of the selected node 321 in window 330. For example, the user can change the threshold value and/or the nodes to which the selected node connects. Moreover, while FIG. 3 shows just a single input node and a single output node to which the selected node connects, the user can add additional connections, and/or remove such connections. In an example embodiment, the system updates the graphical ANN arrangement of window 320 in response to certain modifications made by a user interacting with window 330. For example, certain user-interactions can result in the removal or addition of new connections, in response to which the system removes and/or adds edges to reflect the removal or addition of connections. For example, where the user adds a new output node, the system responsively adds a new edge between the selected node and the newly indicated output node. Where the user removes a previously listed output node, the system responsively removes the previously displayed edge between the selected node and the output node.

In an example embodiment, the window 320 is also user-interactive. For example, the nodes and/or connections can be clicked and dragged. For example, the user can select node 321 and drag it off the screen to delete the respective node. In an example, the system is configured to responsively update the database to reflect the change. For example, the records corresponding to node 321 can be removed, and the records identifying node 321 as either a source node or target node can be updated to remove the reference to node 321 as the source or target node. Responsive to selection of another node to which node 321 previously connected, the system displays the updated information. For example, responsive to subsequent selection of the node previously set as the output node of node 321, the system would display in window 330 that node's information, which information would no longer include a reference to node 321 as an input node.

Similarly, the user can select and modify the attributes of one or more connections of ANN 322 in window 330 (and/or, in an example embodiment, click and drag a connection in window 320). For example, in an example embodiment, responsive to selection of a connection, window 330 displays the name (or connection ID) of the selected connection and the weight of the selected connection. The user can then modify the weight or other attributes, e.g., the identified source and target nodes, of the selected connection in window 330.

In an example embodiment, window 310 of GUI 300 presents a real-time application or simulation of the application of the ANN 322 represented in window 320 and the associated database (and window 330). For example, in an embodiment, window 310 presents a real-time robotics application employing the ANN 322. The robotics application presented in window 310 can show the real-time behavior of a robot 311 controlled by ANN 322 in window 320.

For example, when robot 311 bumps into obstacle 312, a particular set of nodes from ANN 322 can be activated. In response to robot 311 bumping into obstacle 312, in an example embodiment, the system is configured to "light up," e.g., via highlighting, color, hatching, etc., the nodes activated in ANN 322. For example, the color of the activated nodes and/or connections can be changed to red when activated, thereby notifying the user which nodes are activated when, e.g., indicating which events occurred in window 310 affect which of the connections and/or nodes. Similarly, in an example embodiment, the system is configured to display nodes in window 320 with a current charge of zero in white color. Similarly, the system can be configured to change the color of a node to light grey when the current charge of the node becomes negative.

In a further example embodiment, attributes (such as current charge, weight, etc.) associated with nodes and/or connections are displayed in window 320 and/or window 330 so that the user the can view these attributes as they change in real-time. The user can then modify the nodes and/or connections of ANN 322 in windows 320 and 330 to adjust the behavior of robot 311. Moreover, in an example embodiment, the user can modify the values and/or connections during the running of the ANN 322 in the window 310, and the behavior of the ANN 322 in the 310 can thereby change while the ANN 322 runs. The user can thereby immediately notice a change in behavior of the nodes and/or connections.

For example, the user may modify ANN 322 in windows 320 and 330 in order to change the real-time behavior of robot 311. For example, based on the information presented in window 320, the user may realize that node 321 is activated each time robot 311 bumps into an obstacle. The user might decide that node 321 should not be activated on the first bump into an obstacle, but rather, only in response to subsequent bumps. In order to do so, the user can manipulate various attributes of one or more connections via interaction with windows 320 and 330. For example, the user might select node 321 in window 320 and increase the threshold of node 321 in window 330 so that the threshold value is not reached when the robot 311 bumps into an obstacle for the first time. Alternatively, the user might select the connection 323 ending in node 321 in window 320, and decrease the weight of connection 323 in window 330. Alternatively, the user might remove existing connections altogether, and/or add different connections, thereby modifying when the node 321 is activated.

In an another example, the user might decide that bumping into an obstacle should never activate node 321, and thus might delete connection 323, by selecting connection 323 in window 320 and deleting the connection by a predefined input action such as pressing a delete key on a keyboard, or right-clicking on a mouse device to bring up a sub-menu (not shown) which presents the user with an option to delete the connection, and selecting the delete option from the sub-menu, or, as described above, by dragging the connection off the screen.

In yet another example, the user changes the behavior of robot 311 by modifying the origin and destination of existing connections by dragging the end points or start points of the connections shown in window 320 and changing the nodes connected to the connections.

In an example embodiment, the user can change the speed of execution of the simulation displayed in window 310 so that the simulation runs at a speed at which the user can perceive the changes to the nodes in windows 310 and 320. In a further example embodiment, the user can set break points via the GUI to freeze the simulation shown in FIG. 310 so that the user can view the values associated with the nodes and connections in windows 320 and 330 in detail. For example, the user can set a break point indicating that the simulation should freeze when node 326 reaches a particular charge. When node 326 reaches or exceeds that particular charge, the simulation in window 310 will freeze, along with the values displayed in windows 320 and 330. Thus, the user can easily observe the values associated with the nodes and connections at every point in time when node 326 reaches a particular value. After a break point is triggered, the user may continue running the simulation by performing an action, such as pressing a continue simulation button in the GUI 300. In an example embodiment, in the frozen state (i.e., when a break point is triggered), the user can modify the values of nodes and connections via windows 320 and 330 as previously described to observe the results of such modifications.

In another example embodiment, the user can view and/or save the history of a simulation run via the GUI 300. For example, the user can specify the start time and end time of a simulation, optionally give the simulation a name, and when the simulation ends, the history of the simulation can be viewed/saved. The history of the simulation can include details such as the respective values associated with nodes and connections during the course of the simulation, the points in time in which the respective values changed (for example via a time stamped log), and actions which modified the values (for example, an indication that a value changed due to manual modification of the value by the user). In an example embodiment, the history of each simulation can be automatically saved to a storage device, such as a database. In another example embodiment, the history can be manually saved by the user to a file in a storage device, such as a hard drive.

In an example embodiment, the user may associate inputs shown in window 310 to nodes shown in windows 320 and 330 in order to change the real-time behavior of robot 311. For example, the user can select input sensors of robot 311, such as bumpers and speed checkers, and associate these sensors to the nodes of ANN 322 so that when a sensor is activated, the activation causes the associated node(s) to fire. In an example embodiment, the bumper sensor of robot 311 can be associated with node 326 via the GUI 300, and as a result, each time the bumper sensor of the robot touches an obstacle, node 326 will fire. In a further example embodiment, a dedicated window (not shown) may display all the available inputs to the objects/robots shown in window 310. In this dedicated window, the user can choose the nodes from 322 to be associated with the displayed sensors.

The described GUI, which includes features for real-time modification of nodes, connections, and/or their values, while immediately seeing their effects on the running ANN, provides a user a good sense and feel of how modifications of individual connections, and values of nodes and connections, effect the performance of the ANN. It also provides the user with an optimal environment for a holistic try-and-see approach to programming the ANN, similar to how an animal might modify behavior over time.

Although a few examples of modifying the ANN 322 have been discussed above, a person having ordinary skill in the art will appreciate that any aspect of the real-time behavior of the application/simulation in window 310 may be modified and observed by adding new connections and nodes, modifying existing connections and nodes, deleting existing connections and nodes, and changing the relationship between connections and nodes.

In an example embodiment, the information presented in windows 320 and 330 are linked to a back-end storage device. The storage device can be a database with a structure, such as that described above in connection with FIG. 2. The nodes and connections presented in window 320 can be a graphical representation of the information stored in tables of the database. In an example embodiment, as noted above, changes made to the nodes and connections in windows 320 and 330 can be automatically propagated to the back-end database.

In a further embodiment, a window is presented in the GUI 300 in which a listing of the database information is displayed. For example, the described tables are displayed. Alternatively, a spreadsheet listing of all nodes and/or connections, and their respective data, is displayed, for example, where each row of the spreadsheet corresponds to a respective node and/or connection. The user can directly modify values of the spreadsheet, for example, the threshold at which the node of a row is activated, or the weight of connection of a row. Any changes made to the back-end database may be reflected in the windows 320, 330, and/or 310 as appropriate, e.g., immediately, with a predetermined delay, or by a user action such as pressing a refresh button the GUI 300. In an example embodiment, the GUI 300 includes a link in response to selection of which the system displays the described data listing.

In an example embodiment, during the running of the ANN 322 and while its running is graphically represented in the window 310, the system updates values in the displayed listing of database information. For example, the spreadsheet can include rows corresponding to respective nodes of the ANN 322, and which include the respective current charge values of the respective nodes. As the ANN 322 runs, the system automatically updates the current charge values displayed in the data listing. In an example embodiment, whenever a current charge value is updated, the system highlights the value and/or the row that includes the value. In an example embodiment, whenever a node is activated by the running of the ANN 322, the system highlights the row corresponding to the activated node. In an example different highlighting can be used to differentiate between the mere updating of the current charge values and the node activations.

Accordingly, where the user enters a change by interaction with windows 320 and/or 330 while the ANN 322 is running, the user can see the effect of those changes on how the values are modified and/or on how the nodes are activated, as reflected in the listing of database information.

Figure 4:
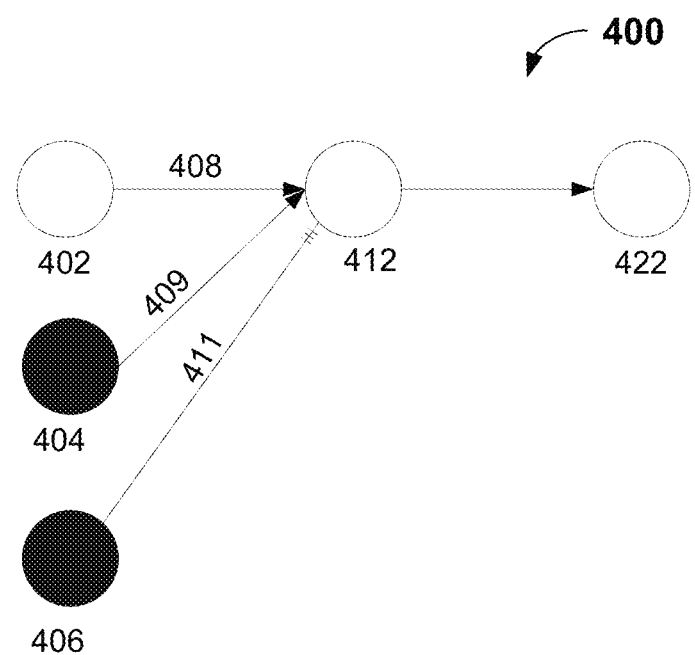
FIG. 4 illustrates an ANN with learning and unlearning capabilities according to an embodiment of the present invention.

FIG. 4 illustrates an exemplary artificial ANN 400 with learning (and unlearning) capabilities according to an example embodiment of the present invention. In an example embodiment, the system is configured to automatically adjust attributes of nodes and/or connections of the ANN based on a particular sequence of events. Such automatic adjustments are referred to herein as learning or unlearning by the ANN. For example, referring to FIG. 4, node 402 is connected to node 412 by connection 408. The weight of connection 408 might be lower than the threshold of node 412. For example, the weight of connection 408 can be 30 and the threshold of node 412 can be 60. Therefore, the activation of node 402, and consequently connection 408, will not always activate node 412.

However, the ANN 400 can be "taught" that the activation of node 402 should always trigger the activation of node 412 through a training node 404 (training nodes are shown in black). The connection 409 connecting training node 404 to 412 can have a positive weight. In an example embodiment, the ANN 400 can be programmed to automatically increase the weight of connection 408 if a training node 404 with a positive connection 409 is activated at the same time as node 402. For example, connection 409 might have a weight of 15. If node 412 initially has a charge of 0, the firing of training node 404 and node 402 at the same time will not activate node 412 because the combined weights of connection 408 and connection 409=45, which is lower than node 412's threshold of 60. However, the weight of connection 408 may now be increased by a predetermined value, for example, 15. Therefore the weight of connection 408 may be increased to 45. Similarly, the next time both nodes 404 and 402 are simultaneously activated, the weight of connection 408 may be increased to 60, which is equal to the threshold of node 412. As a result, any further activations of node 402 alone will always activate node 412.

Conversely, the ANN 400 may be taught that going forward, the activation of node 402 should not always trigger the activation of node 412 through a training node 406. In other words, ANN 400 may be taught to unlearn certain behavior.

For example, in an example scenario, the connection 411 connecting training node 406 to 412 has a negative weight. In an example embodiment, the ANN 400 is programmed to automatically decrease the weight of connection 408 if a training node 406 with a negative connection 411 is activated at the same time as node 402. For example, connection 411 might have a weight of −15. Continuing from the example in the previous paragraph, the weight of connection 408 may currently be 60, and a single activation of node 402 alone might activate node 412 as long as the current charge of node 412 is positive since the weight of connection 408 is equal to the threshold value of node 412. However, if nodes 406 and 402 fire simultaneously, the weight of connection 408 would now be decreased by a predetermined value, for example, 15. Therefore, the system would decrease the weight of connection 408 to 45. As a result, any further activations of node 402 alone will not always activate node 412.

The above learning and unlearning examples can be used in ANNs controlling various applications, e.g., an ANN controlling the behavior of a vehicle in response to traffic lights. For example, node 402 can be activated by an input which senses a yellow traffic light in front of the vehicle. Node 412 can be a node that when activated causes the activation of node 422, and node 422 can be an output node which stops the vehicle. Initially, the weight of node 408 might be lower than the threshold value of node 412. Thus, the vehicle might not stop at every single yellow traffic light since node 402 might not necessarily cause the activation of node 412 every single time. Node 404 might be a positive training node activated each time the brake of the vehicle is engaged. Therefore, each time a yellow light is encountered and the vehicle's brake is engaged simultaneously, the weight of connection 408 can be increased by a predetermined amount, and eventually the weight of connection 408 will be greater than or equal to the threshold value of node 412. At that point, any further activations of node 402 alone will activate node 412, and consequently activate node 422. In other words, any further yellow lights encountered by the vehicle will always cause the vehicle to stop.

The above behavior can be unlearned by the ANN by utilizing a negative training node 406. For example, negative training node 406 can be activated when the accelerator of the vehicle is engaged. Utilizing the principles explained above, the behavior of the vehicle can modified to rarely stop or never stop at a yellow traffic light.

Although the above learning and unlearning embodiments have been explained in the context of trainer nodes, a person having ordinary skill in the art will appreciate that the system can be configured such that other predetermined sequences of events in an ANN can be used to learn or unlearn a behavior.

Figure 5:
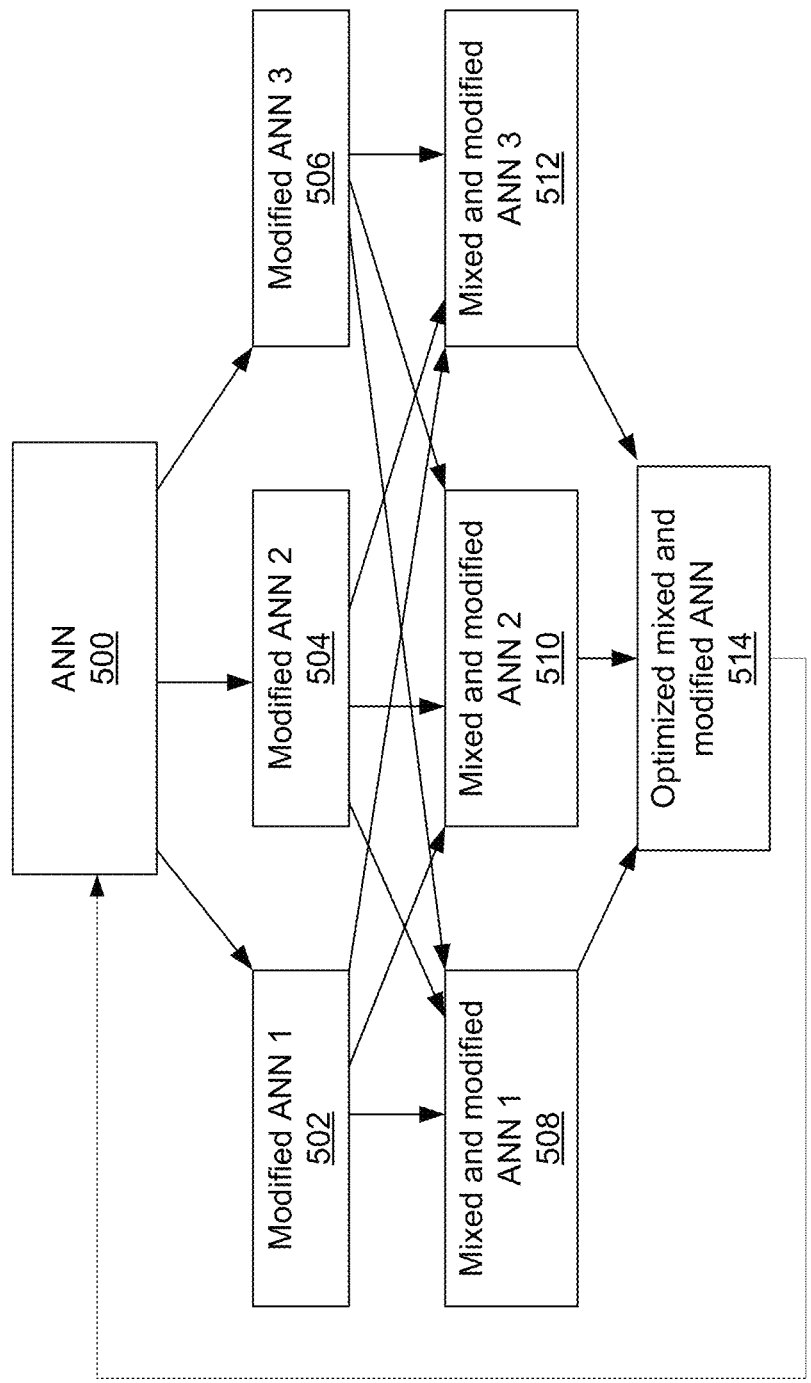
FIG. 5 illustrates an ANN optimization sequence according to an example embodiment of the present invention.

FIG. 5 illustrates exemplary ANN optimization steps. An ANN 500 can be modified by a system to produce multiple versions of ANN 500 (502, 504, and 506). The functionality from the modified versions of ANN 500 (i.e., ANNs 502, 504, and 506) can be combined and modified by the system to produce a set of mixed and modified ANNs (508, 510, and 512). The functionality from the mixed and modified ANNs 508, 510, and 512 can then be combined by the system to produce an optimized ANN 514. The above process can then be repeated on the optimized ANN 514 by the system.

In an example embodiment, the modified ANNs 502, 504, and 506 can be the result of the system changing the configuration of ANN 500 at random (i.e., randomly modifying the node attributes, connection attributes, and/or connections between nodes in ANN 500). Specifically, the system can 1) modify the respective charge thresholds of one or more nodes in the ANN, 2) modify the respective weights of one or more connections in the ANN, 3) add new connections between nodes in the ANN, 4) delete connections between nodes in the ANN, 5) add new nodes to the ANN, and/or 6) delete nodes from the ANN.

In a further example embodiment, the system is configured to modify an ANN to produce desired outputs. In an example embodiment, the modified ANNs 502, 504, and 506 can be the result of changing the configuration of ANN 500 based on expected desired outputs. For example, ANN 500 might contain a first node which is activated each time its corresponding input node is activated. However, the system might determine that it is desirable to activate the first node on a less frequent basis. Thus, compared to ANN 500, modified ANN 1 (502) can have a configuration where the weights of the input connections to the first node are lower, resulting in less frequent activations of the first node. To produce desired outputs, the system can 1) modify the respective charge thresholds of one or more nodes in the ANN, 2) modify the respective weights of one or more connections in the ANN, 3) add new connections between nodes in the ANN, 4) delete connections between nodes in the ANN, 5) add new nodes to the ANN, and/or 6) delete nodes from the ANN.

In an example embodiment, the system might select portions of a first ANN which produce desired outputs and combine it with other portions of a second ANN which produce desired outputs in order to construct a third ANN which is superior to both the first and the second ANN. For example, the system can identify nodes and connections from modified ANNs 502, 504, and 506 which produce desired outputs, and combine them to create mixed and modified ANNs 508, 510, and 512. The ANNs 508, 510, and 512 can be modified by the system 1) further at random, and/or 2) to produce expected desired outputs as described above. The system can then identify nodes and connections from the mixed and modified ANNs 508, 510, and 512 which produce desired outputs, and combine them to create an optimized mixed and modified ANN 514. In an example embodiment, the above described steps may be repeated as needed.

Figure 9:
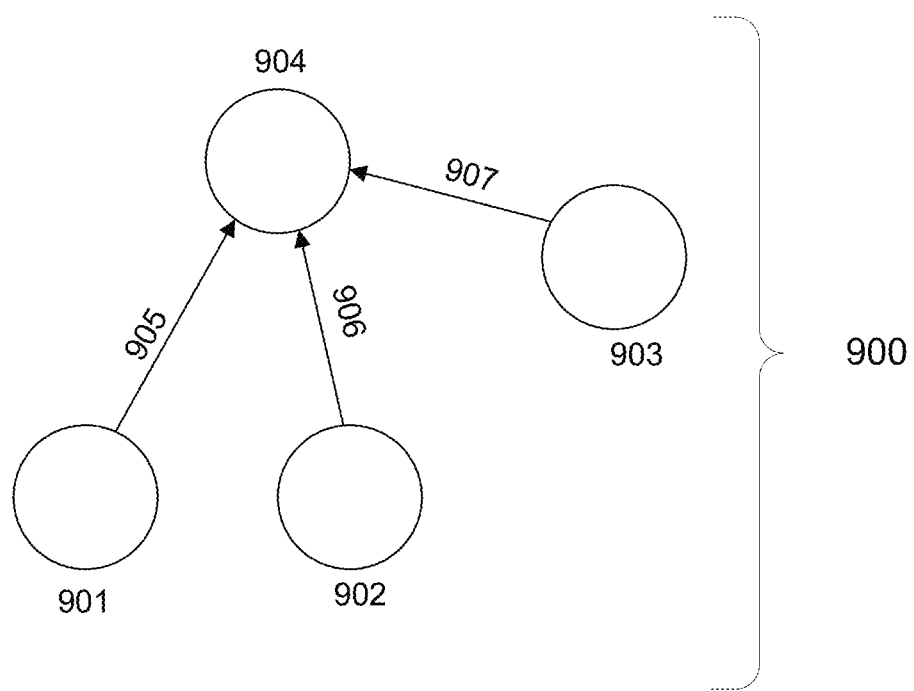
FIG. 9 illustrates an ANN according to an embodiment of the present invention.

FIG. 9 illustrates an ANN 900 in an exemplary embodiment implementing the optimization steps described in relation to FIG. 5. In an exemplary embodiment, a system can modify ANN 900 and optimize it based on a set of desired outputs. For example, the set of desired outputs can be: 1) node 904 is activated when nodes 903 and 902 are simultaneously activated and node 904 is not activated when only one of nodes 903 or 902 is activated, and 2) node 904 is activated when node 901 is activated (regardless of whether nodes 903 and 902 are activated). To achieve the desired outputs, the system can first execute a simulation incorporating ANN 900 with a particular set of weights for connections 905, 906, and 907, and a particular set (and sequence) of inputs to nodes 901, 902, and 903. The system can then determine whether the desired outputs were achieved. In an example embodiment, the system can record the configuration of the ANN 900 for that particular simulation and the desired outputs achieved during the simulation. For example, the system might record that during the first simulation the first desired output was achieved. If all of the desired outputs were not achieved, the system may either 1) randomly modify the weights of connections 905, 906, and 907, or 2) sequentially increment or decrement the weights of connections 905, 906, and 907. Afterwards, the system can run a second simulation with the modified weights. In an example embodiment the system can repeat modifying the values and running simulations until either the number of possible values for the weights have been exhausted or all desired outputs have been achieved. In an example embodiment, the system might select portions of a recorded ANN which produced the first desired output and combine it with other portions of a second recorded ANN which produced the second desired output in order to construct a third ANN. The system can modify the values and run simulations on the third ANN until either the number of possible values for the weights have been exhausted or all desired outputs have been achieved. Thus, the system can manipulate ANN 900 until an optimized version of ANN 900 is obtained.

Figure 6:
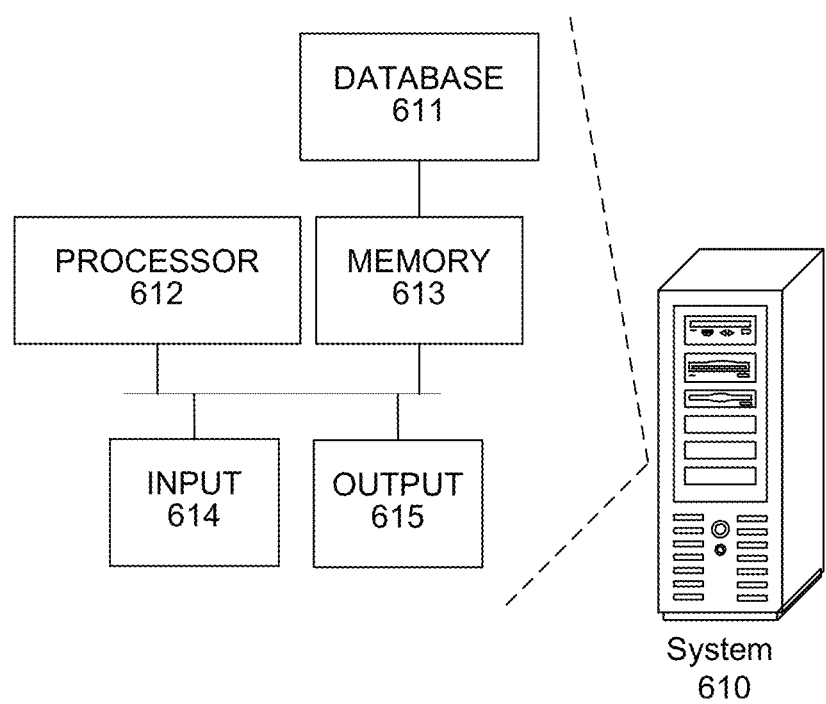
FIG. 6 shows an architecture according to an example embodiment of the present invention.

FIG. 6 shows an exemplary architecture according to an example embodiment of the present invention. The system 610, which is configured to execute one or more applications to view or modify artificial neural network components, can include a desktop computer, laptop computer, tablet PC, client computer, mobile phone, central computer in a vehicle, and/or any other computer. The system 610 can include a processing device 612, memory 613, a database 611, an input interface 614, and an output interface 615, all of which can be interconnected via a system bus.

The output interface 615 can include a computer monitor, a tablet PC screen, a mobile phone screen, a monitor in a vehicle, and/or any other display device. The system can include components for retrieving, presenting, changing, and saving data of the memory 613. Memory 613 can include one or more of a variety of memory devices, for example, Dynamic Random Access Memory (DRAM), Static RAM (SRAM), flash memory, cache memory, and other memory devices. Additionally, for example, memory 613 and processing device(s) 612 can be distributed across several different computers and/or terminals that collectively comprise a system.

Database 611 can include any type of data storage adapted for searching and retrieval. The database 611 can include, for example, Informix, Oracle, DB2, Sybase, MS SQL, MySQL, and other such database systems. The database 611 can store information about ANNs as described in FIG. 2 above.

Processing device 612 can perform computation and control functions of a system and comprises a suitable central processing unit (CPU). Processing device 612 can include a single integrated circuit, such as a microprocessing device, or any suitable number of integrated circuit devices and/or circuit boards working in cooperation to accomplish the functions of a processing device. Processing device 612 can execute computer programs, such as object-oriented computer programs, within memory 613.

In an example embodiment, system 610 can have an architecture with modular hardware and/or software systems that include additional and/or different systems communicating through one or more networks. The modular design may enable a business to add, exchange, and upgrade systems, including using systems from different vendors in some embodiments. Because of the highly customized nature of these systems, different embodiments may have different types, quantities, and configurations of systems depending on the environment and organizational demands.

In an example embodiment, other systems (not shown) can be connected to system 610, and might include a server and can provide one or more of node data, connection data, real-time simulation data, real-time application data of systems incorporating ANNs, and other data to system 610.

Moreover, methods described herein can be distributed among a plurality of processors interconnected by a network, e.g., the Internet. Moreover, in an example embodiment, a processor executing one or more of the methods described herein is situated at a remote server accessed via a network, e.g., the Internet, by a remote terminal operated by a user, user interface results of the executed methods being provided at an output device of the terminal.

An example embodiment of the present invention is directed to one or more processors, which can be implemented using any conventional processing circuit and device or combination thereof, e.g., a CPU of a Personal Computer (PC) or other workstation processor, to execute code provided, e.g., on a hardware computer-readable medium including any conventional memory device, to perform any of the methods described herein, alone or in combination. The one or more processors can be embodied in a server or user terminal or combination thereof. The user terminal can be embodied, for example, as a desktop, laptop, hand-held device, Personal Digital Assistant (PDA), television set-top Internet appliance, mobile telephone, smart phone, etc., or as a combination of one or more thereof. The memory device can include any conventional permanent and/or temporary memory circuits or combination thereof, a non-exhaustive list of which includes Random Access Memory (RAM), Read Only Memory (ROM), Compact Disks (CD), Digital Versatile Disk (DVD), and magnetic tape. Such devices can be used for example for maintaining the described database, providing the described interfaces for receiving updated node and/or connection values, for outputting such values, for graphically displaying the running of a ANN and indicating the values and or activations of the nodes and/or connections during the running of the ANN, etc.

An example embodiment of the present invention is directed to one or more hardware computer-readable media, e.g., as described above, having stored thereon instructions executable by a processor to perform the methods described herein.

An example embodiment of the present invention is directed to a method, e.g., of a hardware component or machine, of transmitting instructions executable by a processor to perform the methods described herein.

In an example embodiment, the ANN is implemented as a collection of software nodes and connections processed by a processor, as described above. Alternatively, the ANN can include hardware components, e.g., switches and connections, where the hardware components are structured and connected to include behavior of the software-implemented nodes and connections described above.

The above description is intended to be illustrative, and not restrictive. Those skilled in the art can appreciate from the foregoing description that the present invention may be implemented in a variety of forms, and that the various embodiments may be implemented alone or in combination. Therefore, while the embodiments of the present invention have been described in connection with particular examples thereof, the true scope of the embodiments and/or methods of the present invention should not be so limited since other modifications will become apparent to the skilled practitioner upon a study of the drawings, specification, and following claims.

What is claimed is:

1. A computer-implemented artificial neural network processing method, comprising:
   modifying, by a computer processor, a value of a charge of a first node of an artificial neural network based on an input to the node, the node being configured to be activated to produce an output responsive to the value of the charge reaching a first threshold value;
   determining, by the processor, that a number of steps, that have elapsed since one of (a) a last activation of the node and (b) a last modification of the value of the charge based on input to the node, is greater than a second threshold value; and
   responsive to the determination, modifying, by the processor, the charge of the node.

2. The method of claim 1, wherein the charge of the node is reset to 0 in the modifying that is responsive to the determination.

3. The method of claim 1, wherein the charge of the node is reset to a predetermined value in the modifying that is responsive to the determination.

4. The method of claim 1, wherein the charge of the node is decreased by a predetermined amount in the modifying that is responsive to the determination.

5. The method of claim 1, further comprising:
   for each occurrence of any of at least one qualifying event, incrementing a value of a first variable; and
   one of (a) responsive to each modification of the value of the charge of node based on input to the node and (b) responsive to each activation of the node, updating a value of a second variable to be consistent with the value of the first variable;
   wherein the determining includes comparing the values of the first and second variables.

6. The method of claim 1, further comprising:
   storing, by the processor, a plurality of node records, each including a respective identifier of a respective one of the nodes, the respective charge value of the respective node, and a respective step identifier identifying a step at which the respective node one of had been activated and had its charge value modified in response to an input by an activated connection to which the respective node connects;
   storing, by the processor, a plurality of connection records, each including a respective identifier of a respective connection between a respective pair of nodes corresponding to a pair of the stored plurality of node records, a respective identifier of a first one of the respective pair of nodes from which the respective connection originates, a respective identifier of a second one of the respective pair of nodes at which the respective connection terminates, and a respective weight; and
   producing, by the processor, an output based on values identified in the node records and the connection records.

7. The method of claim 6, further comprising:
   for each of the plurality of node records:
   modifying its respective charge value according to the weight of one of the connection records that specifies the respective identifier of the respective node of the respective node record as the second of the respective pair of nodes of the respective connection record upon activation of the respective connection;
   comparing the modified charge value to an activation threshold; and
   responsive to determining in the comparing step that the modified charge value satisfied the activation threshold, updating a charge value of another node corresponding to another of the stored plurality of node records, the another node being identified, by another of the plurality of connection records that identifies the respective node as the node from which the respective connection of the another of the plurality of connection records originates, as the node at which the respective connection of the another of the plurality of connection records terminates.

8. The method of claim 7, wherein different activation thresholds are used in the comparing step for different ones of the nodes to which the plurality of node records correspond.

9. The method of claim 6, wherein the modification of the node charge responsive to the determination includes modifying the respective charge value of the node record of the respective node, and the determination of the number of elapsed steps is based on a number of elapsed steps since the step identified by its respective step identifier of the respective record.

10. The method of claim 6, wherein:
the plurality of node records are stored in a first table that includes a first column in which the node identifiers of the node records are stored, a second column in which the step identifiers of the node records are stored, and a third column in which the charge values of the node records are stored; and
the plurality of connection records are stored in a second table that includes a first column in which the connection identifiers of the connection records are stored, a second column in which the identifiers of the originating nodes of the connection records are stored, a third column in which the identifiers of the terminating nodes of the connection records are stored, and a fourth column in which the weights of the connection records are stored.

11. The method of claim 10, wherein each row of the first table corresponds to a respective one of the node records, and each row of the second table corresponds to a respective one of the connection records.

12. The method of claim 6, wherein for each of the connection records, the node identifiers of the respective connection record correspond to the node identifiers of the node records corresponding to the pair of nodes connected by the respective connection of the respective connection record.

13. The method of claim 6, wherein each of the node records further includes an identification of the respective activation threshold used for the node to which the respective node record corresponds.

14. The method of claim 1, further comprising:
displaying, by the processor and in a first portion of a graphical user interface, a real-time graphical representation of the neural network; and
displaying, by the processor and in a second portion of the graphical user interface, real-time graphical effects of a running of the neural network.

15. The method of claim 14, wherein the node is one of a plurality of nodes of the neural network, the neural network further includes connections between pairs of the plurality of nodes, and the method further comprises:
responsive to user-selection from the first portion of the graphical user interface of one of a graphical representation of one of the connections and a graphical representation of one of the nodes, displaying attributes of the one of the connection and the node of the selected graphical representation.

16. The method of claim 14, wherein the node is one of a plurality of nodes of the neural network, the neural network further includes connections between pairs of the plurality of nodes, and the method further comprises:
graphically indicating in the first portion a real-time activation of at least one of a node and a connection of the neural network that is graphically represented in the first portion.

17. The method of claim 14, further comprising:
responsive to user interaction with the graphical representation in the first portion, modifying attributes of one or more components of the neural network, wherein the modification affects in real-time the graphical effects displayed in the second portion of the graphical user interface.

18. The method of claim 17, wherein the user interaction includes editing attributes associated with one of a selected connection and a selected node.

19. The method of claim 17, wherein the user interaction includes manipulating the graphical representation of at least one connection in the first portion to change at least one node connected to the at least one connection.

20. The method of claim 17, further comprising:
storing in a database all modifications made to the neural network via the graphical user interface.

21. The method of claim 1, wherein the node is one of a plurality of nodes of the neural network, the method further comprising:
responsive to simultaneous activation of at least a first input node and a second input node connected to a third node of the neural network, modifying, by the processor, a weight of a connection between the first input node and the third node.

22. The method of claim 21, wherein modifying the weight includes increasing the weight if a connection weight between the second input node and the third node is positive.

23. The method of claim 21, wherein modifying the weight includes decreasing the weight if a connection weight between the second input node and the third node is negative.

24. The method of claim 21, wherein the artificial neural network is integrated into a robotics system, and the weight modification changes the behavior of the robotics system.

25. The method of claim 1, wherein the node is one of a plurality of nodes of the neural network, the neural network further includes connections between respective combinations of the nodes, and the method further comprises:
modifying, by a computer processor, at least one of a) respective weight(s) of at least a connection of the neural network, and b) respective threshold(s) of at least a node of the neural network;
responsive to a plurality of inputs to the neural network, determining whether at least one output of the neural network matches at least one desired output;
upon determining that at least one output of the neural network matches at least one desired output, saving a configuration of the neural network and outputs of the neural network; and
repeating the modifying, the determining, and the saving steps until the at least one output of the neural network matches all desired outputs.

26. The method of claim 1, wherein each modification of a charge value of a second node without any modification of the charge value of the first node is counted by the processor as a discrete one of the steps.

27. The method of claim 1, wherein the charge of the node is increased in response to the input to the node, and the charge of the node is decreased in the modifying that is responsive to the determination.

28. A computer system for artificial neural network processing, the system comprising:
a computer processor configured to:
modify a value of a charge of a node of an artificial neural network based on an input to the node, the node being configured to be activated to produce an output responsive to the value of the charge reaching a first threshold value;
determine that a number of steps, that have elapsed since one of (a) a last activation of the node and (b) a last modification of the value of the charge based on input to the node, is greater than a second threshold value; and responsive to the determination, modify the charge of the node.

29. A non-transitory computer-readable medium on which are stored instructions that are executable by a processor, the instructions which, when executed by the processor, cause the processor to perform a method for artificial neural network processing, the method comprising:

modifying a value of a charge of a node of an artificial neural network based on an input to the node, the node being configured to be activated to produce an output responsive to the value of the charge reaching a first threshold value;

determining that a number of steps, that have elapsed since one of (a) a last activation of the node and (b) a last modification of the value of the charge based on input to the node, is greater than a second threshold value; and responsive to the determination, modifying the charge of the node.

* * * * *